INVENTOR.
Max P. Baker
BY
His Attorney

Aug. 2, 1966  M. P. BAKER  3,263,447
CONSTANT VELOCITY UNIVERSAL JOINT
Filed Jan. 9, 1964  2 Sheets-Sheet 2

INVENTOR.
Max P. Baker
BY
Albert H. Reuther
His Attorney

United States Patent Office 3,263,447
Patented August 2, 1966

3,263,447
CONSTANT VELOCITY UNIVERSAL JOINT
Max P. Baker, Dayton, Ohio, assignor to General Motors Corporation, Detroit, Mich., a corporation of Delaware
Filed Jan. 9, 1964, Ser. No. 336,729
1 Claim. (Cl. 64—21)

This invention relates to power transfer and, more particularly, to a constant velocity universal joint having a unique arrangement of components.

A particular need exists on front end drive vehicles for maintenance of substantially constant velocity during power transfer. Otherwise noise from transmission bearings, drive shafts and other vehicle power train components can become objectionable to vehicle operator and occupants. Thus, an object of the present invention is to overcome noise problems with a new and improved arrangement of articulated components in a constant velocity universal joint.

Another object of this invention is to provide a central ball joint means for joining shafts to abut each other at all times while pairs of remaining articulated linkages therewith utilize both spherical as well as cylindrical bearing means always maintained in a predetermined relation to each other.

Another object of this invention is to provide a constant velocity universal joint arrangement including a pair of shaft end portions telescopically joined to each other in a substantially spherical bearing means located axially adjacent to a pair of cylindrical-bearing means articulated shaft ends as well as a pair of radially outwardly located spherical bearings joined to the cylindrical-bearing means articulated shaft ends by links of length equal to each other and for transmitting torque from one shaft to another.

A further object of this invention is to provide a universal joint arrangement of components including a pair of axially separated cylindrical bearing portions joined to axially-separated shaft means and three spherical bearing portions having centers that always lie in a straight line which bisects any angle between adjoining shaft means.

Another object of this invention is to provide in combination on a constant velocity universal joint structure a pair of cylindrical bearing means articulated with end portions of shaft means having telescopic fit to each other in a central spherical ball joint portion therebetween as well as a pair of additional outwardly positioned spherical ball joint portions maintained by links in a parallelogram relation to the cylindrical bearing means such that at all times a straight line intersection exists between all three spherical ball joint portions.

Further objects and advantages will become apparent from the following description, reference being had to the accompanying drawings wherein a preferred embodiment of the present invention is clearly shown.

Figure 1:
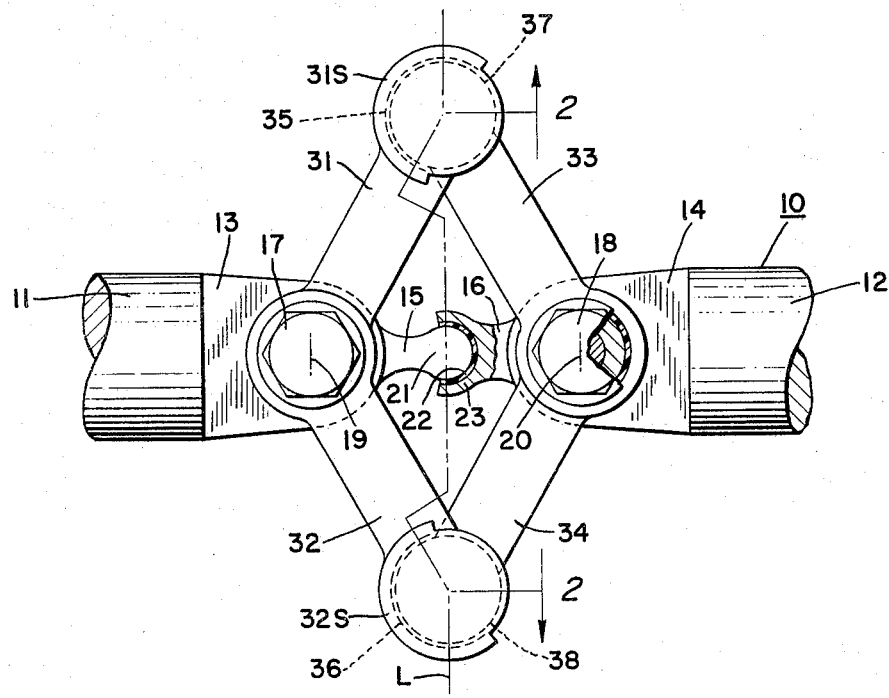
FIGURE 1 is an elevational view of a constant velocity universal joint in accordance with the present invention.

FIGURE 1 shows a constant velocity universal joint means generally indicated by numeral 10 including a pair of axially separated shafts 11 and 12 between which power is to be transmitted subject to change of angular positioning therebetween. The shaft 11 has a projection or an extension 13 of reduced width integral therewith as is true also for such an extension or projection 14 integral with the shaft 12. Each of the shafts with the integral extension includes a further reduced or smaller end portion thereof indicated by reference numerals 15 and 16 respectively. These end portions can be on a side opposite to the extension or projection of each shaft means such that there can be pivotal or journaled connection of a cylindrical member or pin such as 17 and 18 each with threaded-nut or other suitable fastening to maintain assembly thereof. Thus the cylindrical member or pin 17 can define an axis 19 centrally thereof and similarly the cylindrical member or pin 18 has an axis 20 centrally thereof.

Figure 2:
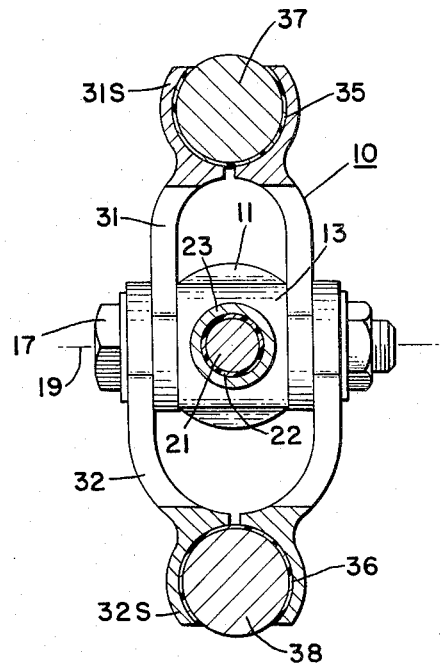
FIGURE 2 is a cross-sectional view taken along line 2—2 in FIGURE 1.

Each of the articulated shaft end portions 15–16 cannot only move pivotally about the axes 19–20 of cylindrical bearing means but also can pivot centrally as to each other due to provision of a head or ball portion 21 integral with the end portion 15 and shaft 11 as well as extension 13 thereof. This head or ball portion 21 is substantially spherical in shape and is seated in a semi-spherical bearing means 22 and complementary socket 23 integral with the end portion 16 of shaft means 12 with extension 14 integral therewith. The bearing means 22 can be bonded either to the inner periphery of the socket 23 or the outer periphery of the ball or head portion 21. Thus the shaft means 11 and 12 have end portions 15–16 thereof always pivotally joined to each other by a spherical bearing means or ball joint structure centrally therebetween. In accordance with the present invention there are pairs of links or pivotal arms journaled about the cylindrical member 17 and adapted to move pivotally about the axis 19 as well as the axis 20. These links are identified by reference numerals 31, 32, 33 and 34 in FIGURE 1 and include bifurcated ends integral therewith for pivotal mounting or journaling about the cylindrical members or pins 17 and 18 respectively. Such bifurcated ends for the links or levers 31 and 32 for example can be seen in the view of FIGURE 2.

Further in accordance with the present invention, additional spherical bearing means located laterally or radially outwardly from the juncture of the shaft means can be provided such that one pair of links or levers will have socket portions formed thereby while mating heads or spherical ball portions are provided by the remaining pair of links or levers. Thus in the illustrations of the drawings the link 31 has a socket portion 31S formed integrally therewith while the link 32 has a socket portion 32S formed integrally therewith. A bearing surface having suitable friction characteristics can be provided complementary to an inner periphery of each of the socket surfaces and these are indicated by reference numerals 35 and 36 for the socket portions 31S and 32S respectively in FIGURE 2. Sperical head or ball portions 37 and 38 are provided integrally with the links 33 and 34 respectively as shown in the drawings. It is to be understood that bearing structure for the cylindrical bearings as well as the three spherical bearings can include low friction fluoride materials in accordance with a disclosure of a U.S. Patent 3,097,060, Sullivan, issued July 9, 1963, and belonging to the assignee of the present invention.

Figure 3:
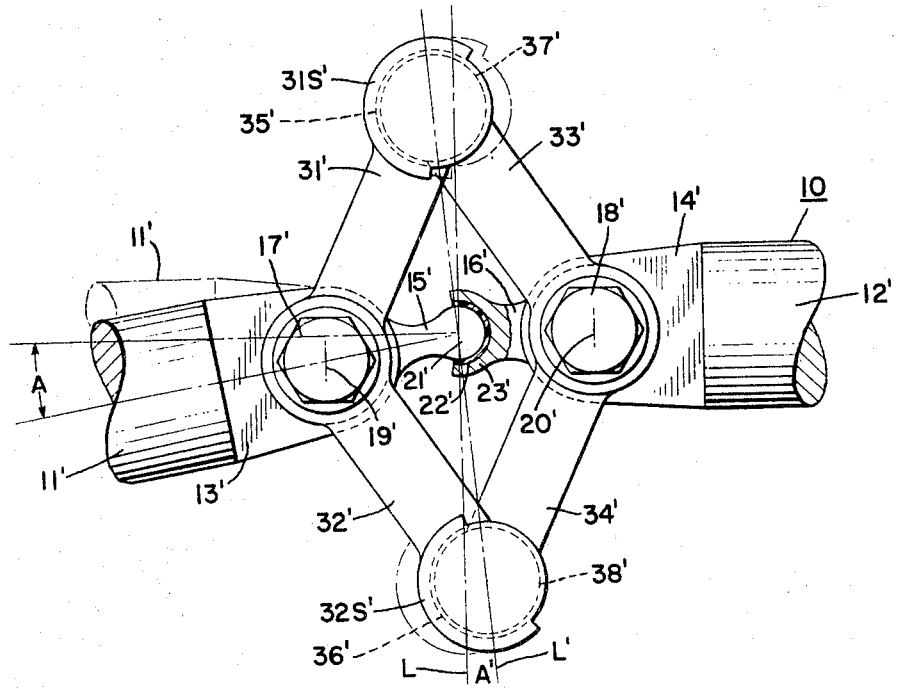
FIGURE 3 illustrates positioning of components of the joint of FIGURE 1 in one intermediate angular relationship.
Figure 4:
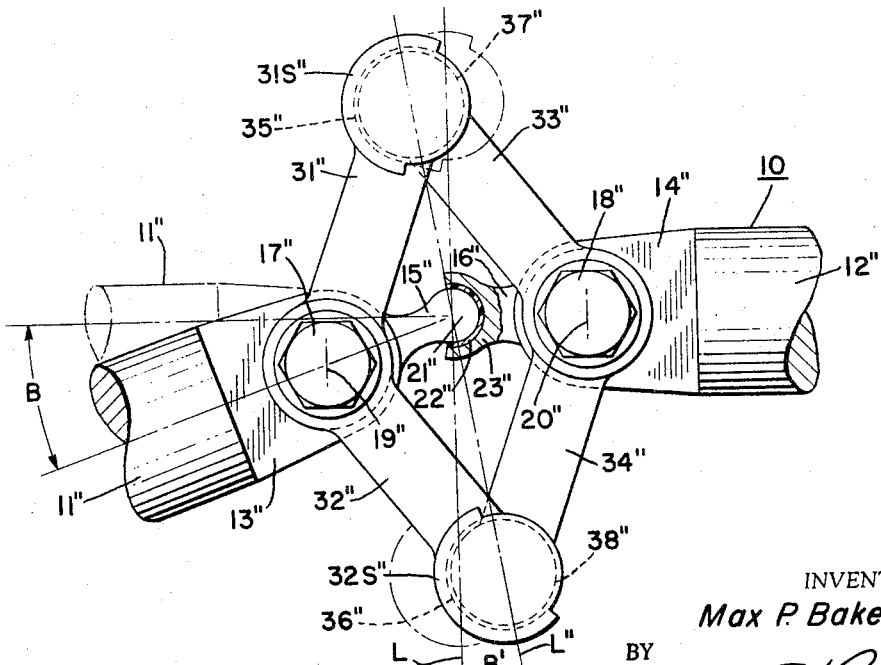
FIGURE 4 illustrates positioning of the components of the joint of FIGURE 1 in a further angular relationship.

FIGURE 3 illustrates positioning of the components of the joint of FIGURE 1 in an intermediate angular relationship in which all components have identification by reference numerals with a single prime added thereto. Similarly in FIGURE 4 there is illustrated positioning of the components of the joint of FIGURE 1 in a further angular relationship in which identical reference numerals are used having double primes added thereto. To emphasize extent of angular displacement in the views of FIGURES 3 and 4 there are background outlines for the components in axial relationship as originally illustrated in FIGURE 1. It is emphasized that regardless of the angular displacement from the axial co-alignment between the shaft means the ball joint portion including the head or ball portion 21, liner 22 and socket 23 permits central joining and pivoting between the end portions of the two shaft means 11 and 12. The angular displacement of the shaft means 11 to an intermediate position indicated by the prime application of reference numerals can be indicated further by a showing of an angle "A" for representing departure from the initial axis of both shaft means. Similarly it is to be noted that at all times the centers of the central ball joint portion 21-22-23 as well as the outer ball joint portions 31S-35-37 and 32S-36-38 will always be located in a straight line represented by a letter "L" in FIGURE 1 to which a single prime is added in FIGURE 3 and a double prime is added in FIGURE 4. Greater angular displacement in FIGURE 4 is represented by change of position of the axis of the shaft means 11 by an angle "B" and the corresponding change or shift between positioning of the straight lines through the centers of the ball joint portions as represented by an angle identified by a reference of one prime added to a letter "B." It is to be understood that movement of shaft means 12 can occur from its initial axial co-alignment and that the movement for the shaft means 11 indicated in FIGURES 3 and 4 is merely provided for purposes of illustration. The links 31, 32, 33 and 34 are all of equal length to each other and transmit torque from one shaft to another. The straight line L which can be drawn through the centers of the three ball joint portions always bisects the angle between the two shaft means. The bearings at the centers or axes 19 and 20 are cylindrical while the bearings of all three ball joint portions are spherical. A parallelogram-like configuration is formed by the links 31, 32, 33 and 34 regardless of angular alignment or misalignment between the shaft means 11 and 12.

While the embodiment of the present invention as herein disclosed constitutes a preferred form, it is to be understood that other forms can be adopted.

What is claimed is as follows:

In a constant velocity universal joint arrangement between a pair of shaft ends of reduced size forming a spherical bearing means including a rounded head portion carried by one shaft end and a central socket portion carried by another shaft end in complementary though pivotal fit to each other as well as a pair of diagonally opposite spherical bearing means each having a ball and split socket portions laterally in opposite outward locations from the rounded head portion and central socket portion, the improvement therewith which comprises cup-shaped low friction fluoride material in both said diagonally opposite spherical bearing means as well as said central socket portion, and two pairs of complementary levers all of equal length as well as each pair having said split socket portion integrally therewith, said pairs of levers each having cylindrical bearing pivotal attachment also including annular low friction fluoride material journalling as to each shaft end, said two pairs of levers each having collective interfit so that at least one lever of each pair is symmetrically split into shell-like complementary socket portions each carried by a lever arm portion and separable on opposite sides of a plane coincident with axes of the shaft ends with said cylindrical bearings each transverse thereto, with said opposite spherical bearing means and said central socket portion all having said low friction fluoride material therewith in addition to said low friction fluoride material at the cylindrical bearing attachment at each shaft end for overcoming noise problems.

References Cited by the Examiner

UNITED STATES PATENTS

| | | | |
|---|---|---|---|
| 898,423 | 9/1908 | Bartlett | 64—21 |
| 2,137,179 | 11/1938 | Nelson | 64—21 |
| 2,206,291 | 7/1940 | Nelson | 64—21 |
| 2,981,084 | 4/1961 | Glover | 64—21 |
| 3,101,961 | 8/1963 | White. | |

FOREIGN PATENTS 450,586 7/1936 Great Britain.

MILTON KAUFMAN, *Primary Examiner.*
BROUGHTON G. DURHAM, *Examiner.*
D. H. THIEL, *Assistant Examiner.*